O. KLUGE.
BALING MECHANISM.
APPLICATION FILED JULY 10, 1912.

1,062,243.

Patented May 20, 1913.
5 SHEETS—SHEET 1.

Witnesses

Otto Kluge, Inventor,
by C. A. Snow & Co.
Attorneys.

O. KLUGE.
BALING MECHANISM.
APPLICATION FILED JULY 10, 1912.

1,062,243.

Patented May 20, 1913.
5 SHEETS—SHEET 2.

Witnesses

Otto Kluge Inventor,
by C. A. Snow & Co.
Attorneys.

O. KLUGE.
BALING MECHANISM.
APPLICATION FILED JULY 10, 1912.

1,062,243.

Patented May 20, 1913.
5 SHEETS—SHEET 3.

Witnesses

Otto Kluge  Inventor,
by C.A. Snow & Co.
Attorneys.

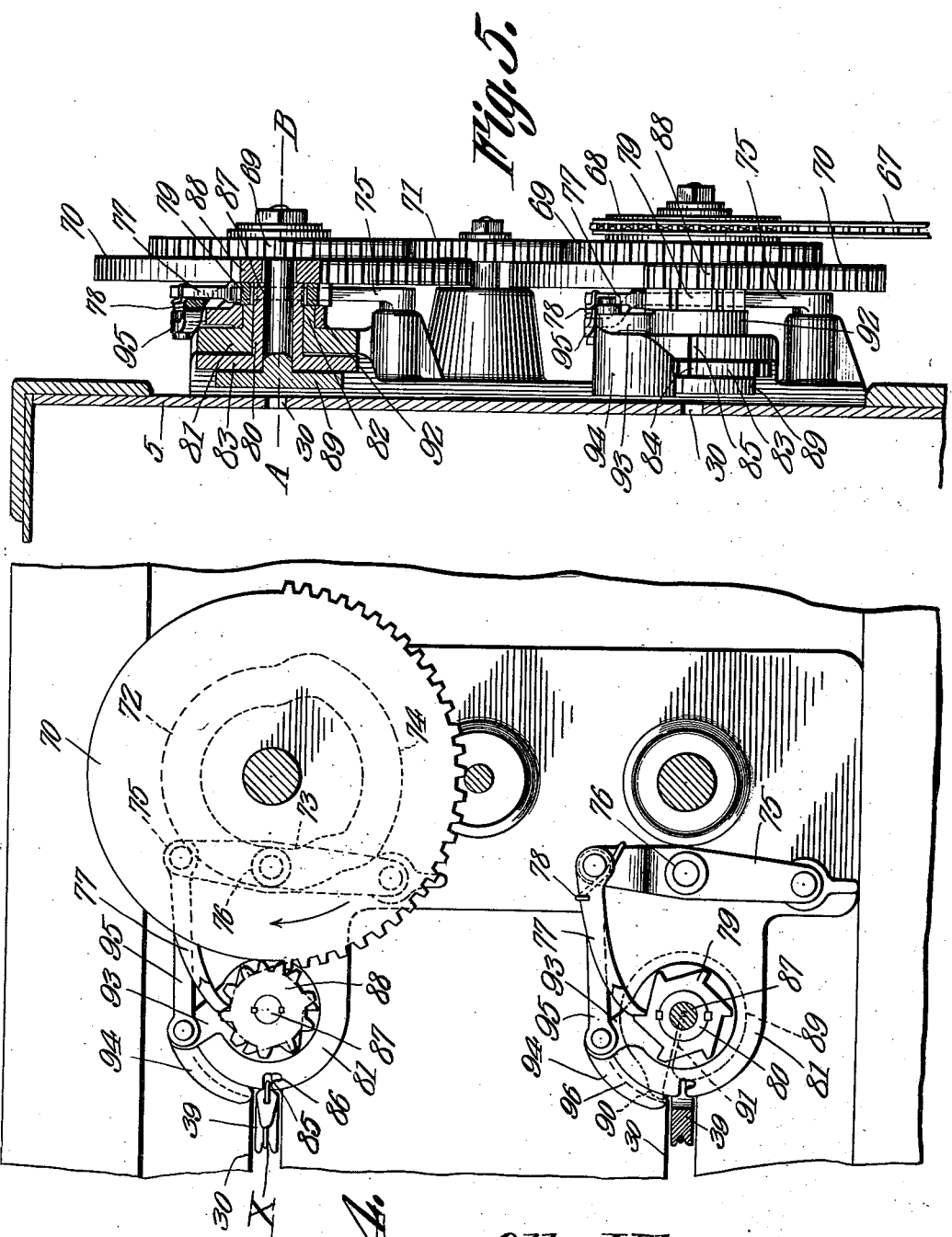

O. KLUGE.
BALING MECHANISM.
APPLICATION FILED JULY 10, 1912.
1,062,243.
Patented May 20, 1913.
5 SHEETS—SHEET 5.
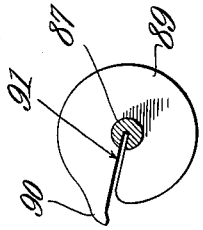
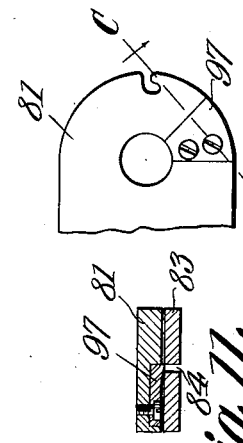
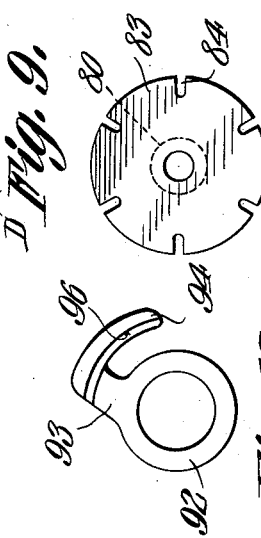
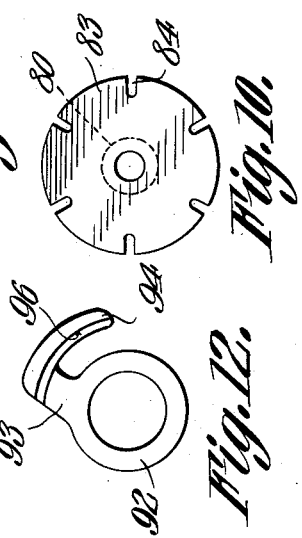
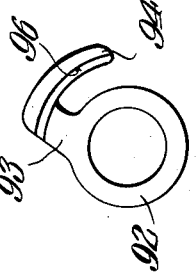
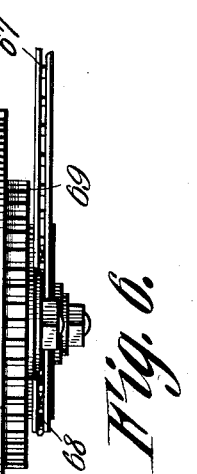
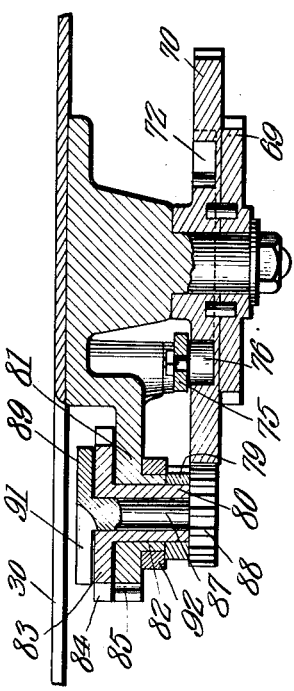
Witnesses
Otto Kluge  Inventor,
by C. A. Snow & Co.
Attorneys.

UNITED STATES PATENT OFFICE.

OTTO KLUGE, OF GOLCONDA, ILLINOIS.

BALING MECHANISM.

1,062,243.

Specification of Letters Patent.  Patented May 20, 1913.

Application filed July 10, 1912. Serial No. 708,724.

*To all whom it may concern:*

Be it known that I, OTTO KLUGE, a citizen of the United States, residing at Golconda, in the county of Pope and State of Illinois, have invented a new and useful Baling Mechanism, of which the following is a specification.

This invention relates to mechanism particularly designed for baling straw and other waste material discharged from machines such as used in threshing peas, wheat, etc.

One of the objects of the invention is to provide baling means constituting an integral part of the threshing machine and which is designed to operate continuously during the threshing operation and to bale the material as fast as it is discharged from the thresher.

Another object is to provide improved means operable independently of the plunger or follower of the baler whereby the bales are tied automatically upon attaining a predetermined size.

Another object is to provide bale binding and tying mechanism which is comparatively simple in construction and the parts of which are readily accessible for the purpose of repairing or cleaning them.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
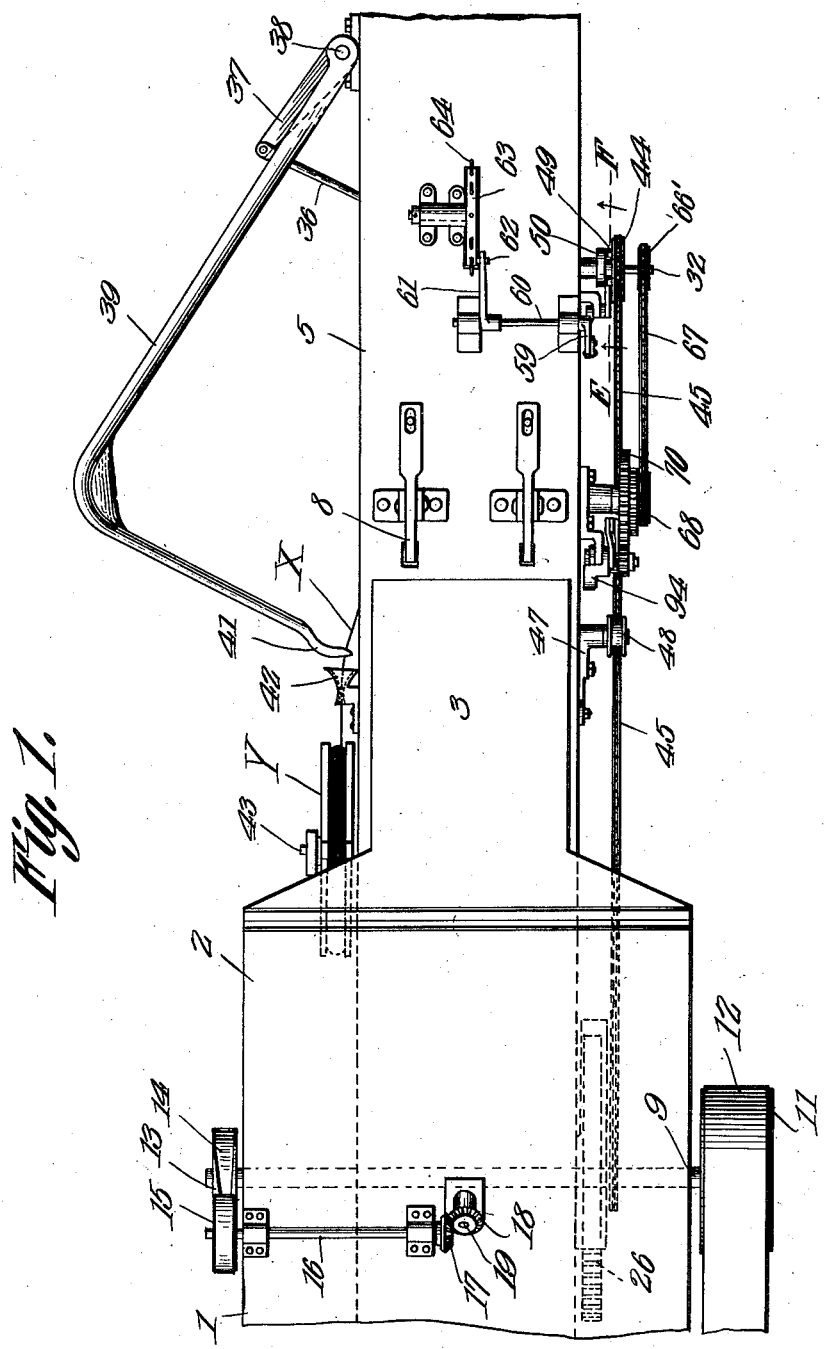
Figure 2:
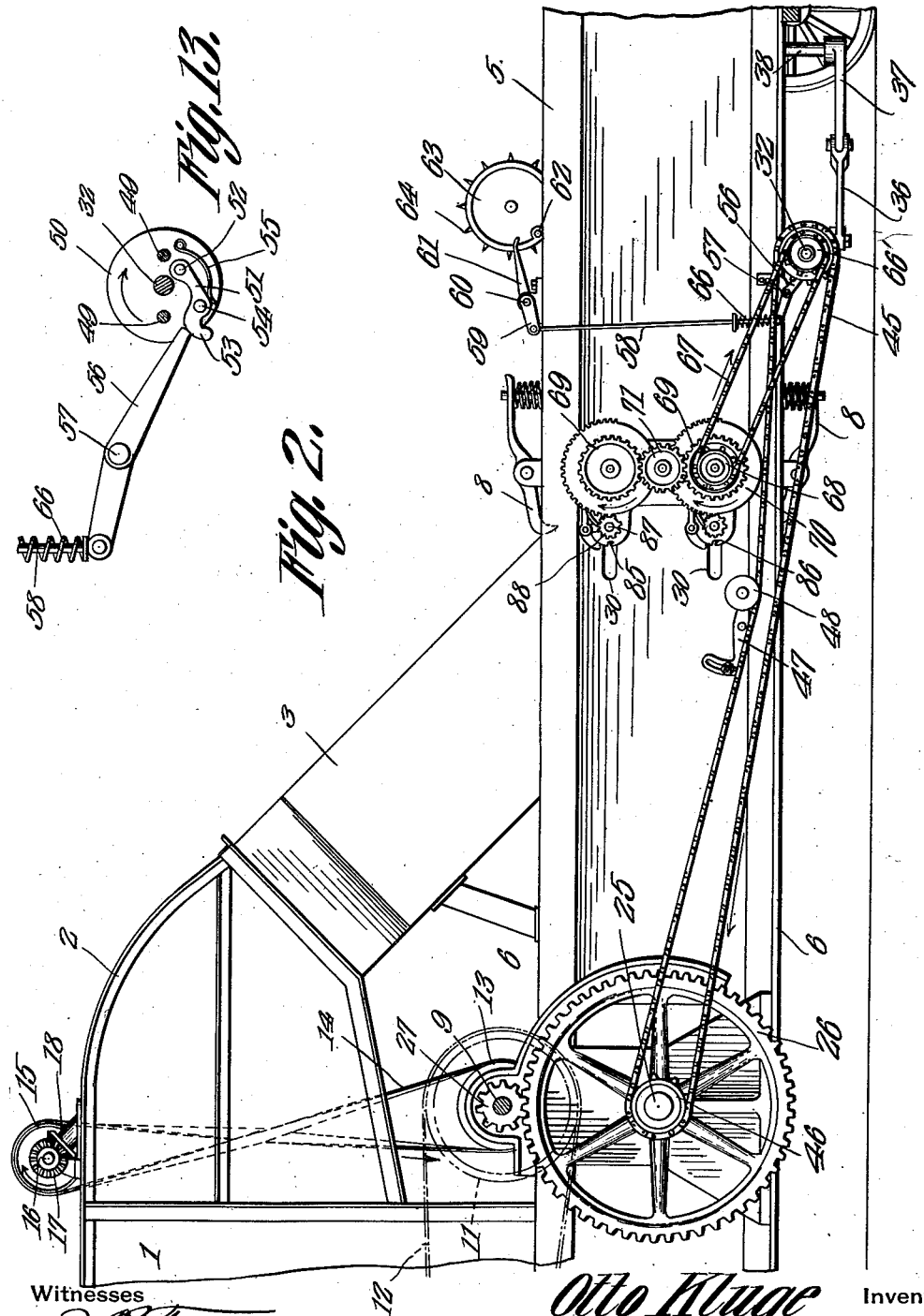
Figure 3:
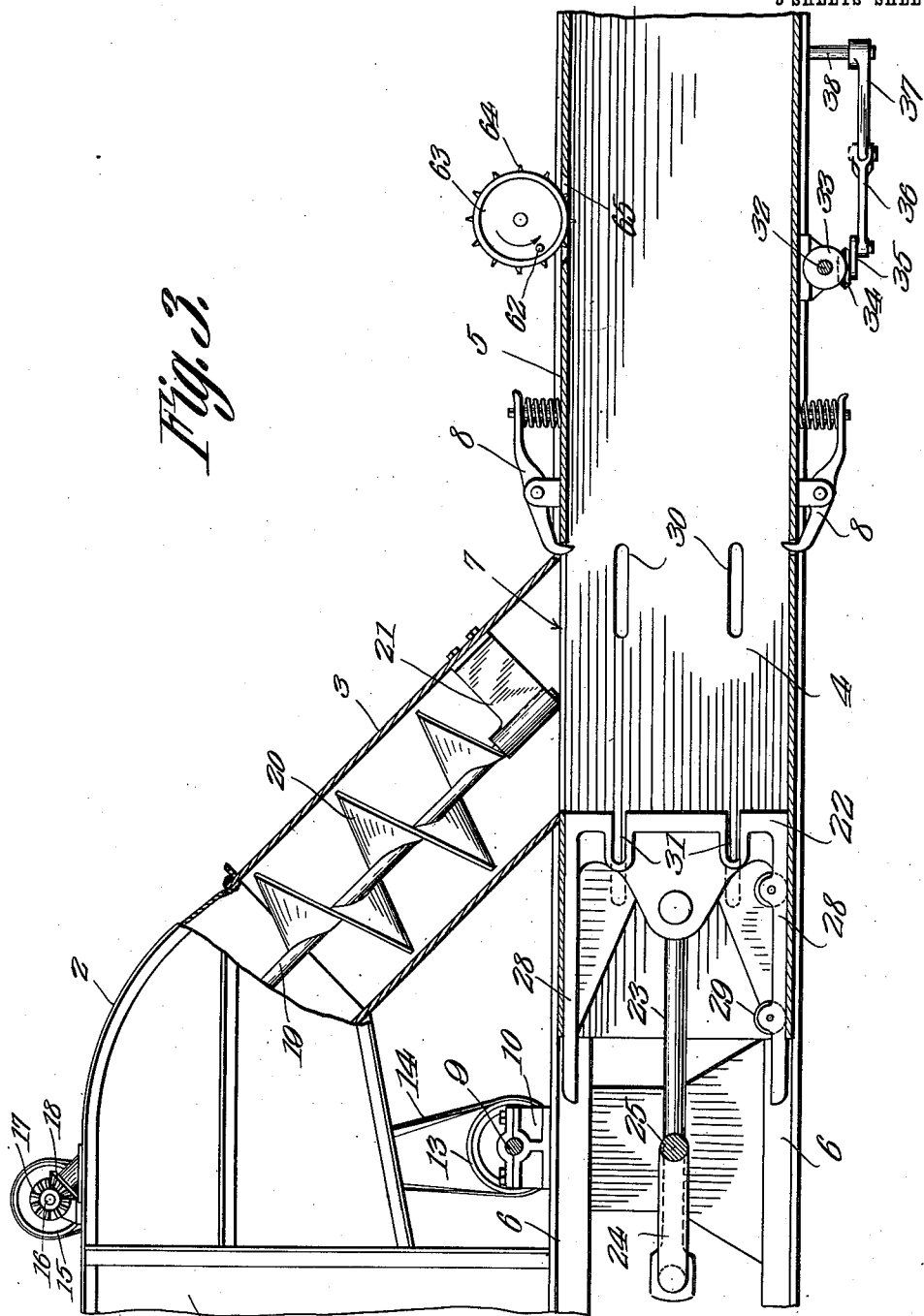

In said drawings:—Figure 1 is a plan view of one end portion of a threshing machine having the present improvements combined therewith. Fig. 2 is a side elevation of the parts shown in Fig. 1. Fig. 3 is a vertical longitudinal section through the baling mechanism, a portion of the thresher being shown in elevation. Fig. 4 is a view partly in front elevation and partly in section of the head tying means. Fig. 5 is an enlarged view partly in elevation and partly in section of the mechanism utilized for fastening together the ends of two ties. Fig. 6 is a plan view of the tying mechanism, a portion of the needle being shown in position. Fig. 7 is a horizontal section through said mechanism, said section being taken on the line A—B Fig. 5. Fig. 8 is a detail view of the twister, its shaft being shown in section. Fig. 9 is an elevation of the stationary gripping member, the cutting blade being shown thereon. Fig. 10 is a side elevation of the movable gripping member. Fig. 11 is a section through the fixed gripping member, said section being taken on the line C—D Fig. 9, and the movable gripping member being also shown in section. Fig. 12 is a side elevation of the loop spreading member. Fig. 13 is an enlarged section on line E—F Fig. 1 and showing the clutch mechanism.

Referring to the figures by characters of reference 1 designates a portion of a threshing machine having an outlet casing or extension 2 to which a straw stacker is ordinarily connected. In the present instance, however, the stacker is dispensed with and in lieu thereof is provided a downwardly inclined casing 3 opening into the top of the baling chamber 4 of a press box 5. This press box is connected to the casing 1 so as to constitute practically an integral part thereof, the connections being indicated at 6. In all ordinary respects the box 5 is similar to the ordinary baling box and, as shown in the drawings, there are provided on the top and bottom of the box and close to the inlet 7 thereof, spring pressed dogs 8 designed to engage the compressed material in the box so as to prevent expansion thereof back toward the inlet.

A drive shaft 9 is carried by the thresher, said shaft being preferably journaled in boxes 10 supported by the upper connections 6. This shaft has a pulley 11 thereon receiving motion, as through a belt 12 from any suitable source of power and another pulley 13 is secured to the shaft 9 and is adapted to transmit motion, through a cross belt 14 or the like, to a pulley 15 secured to a transverse shaft 16 which is journaled on top of the casing 2. A bevel gear 17 is secured to the shaft 16 and meshes with another bevel gear 18 secured to the upper end of an inclined shaft 19 which extends downwardly along the longitudinal center of the casing 3 and has a feed worm 20 secured to it, the lower end of the shaft being journaled preferably in a bracket 21 supported within 11 the lower portion of the feed casing 3. Thus it will be seen that, during the actuation of the shaft 9, motion will be transmitted therefrom to the inclined shaft 19 and the feed screw 20 will be operated to direct material positively from the casing 2 and downwardly through the feed casing 3 into the baling chamber 4. A baling head or follower 22 is mounted to reciprocate within the box 5 and is connected, by means of a pitman 23, to a crank 24 secured to a shaft 25 which is journaled between the connections 6 and below the shaft 9. A large gear 26 is secured to the shaft 25 and meshes with a small gear 27 secured to the shaft 9. Thus it will be seen that shaft 25 will be caused to rotate slowly and will, during such rotation, reciprocate the head or follower 22. This follower is preferably formed with upper and lower rearwardly extending wings 28 the lower one of which has anti-friction rollers 29 adapted to bear upon the bottom of the press box. Thus friction will be reduced to the minimum during the reciprocation of the follower. The size of the crank 24 is such as to give a stroke to the head or follower 22 sufficient to cause it to pass completely across the inlet 7, the upper wing 28 during this movement, serving to close this inlet and thus to prevent material from entering the press box and back of the follower.

Any desired number of ties may be used for binding the bales. The mechanism shown in the accompanying drawings provides for two of the ties. For this reason two needle receiving openings 30 are formed in each side wall of the box 5 and below that portion of the inlet 7 nearest the dogs 8. A corresponding number of needle receiving grooves 31 are formed within the working face of the follower 22, these grooves, as shown by dotted lines in Fig. 3, gradually increasing in depth toward that side of the press box from which the binding needle, hereinafter described, normally extends. A shaft 32 extends transversely under the press box 5 and has a gear 33 secured thereto and meshing with another gear 34 arranged under the press box 5. A crank arm 35 rotates with the gear 34 and is connected, by a pitman 36, to another crank arm 37 extending radially from the lower end of a needle shaft 38. This needle shaft is journaled on one side of the press box and is arranged perpendicular to the bottom of the box, there being a needle 39 of the usual type connected to the upper end of the shaft 38 and provided, at its free end, with an eye 40, said end portion being bowed as shown at 41. The normal position of the needle has been illustrated in Fig. 1, the free end thereof being arranged beyond the side wall of the press box 5 but in position to pass readily through one of the needle receiving openings 30. It is of course to be understood that in the present machine two needles 39 are used, one being arranged directly above the other. The eye of each needle, when in normal position, is disposed in front of a tubular guide 42 through which the tie wire X extends from a reel Y which is mounted for rotation on a stud 43 extending from the side of the press box.

A sprocket 44 is loosely mounted for rotation on shaft 32 and receives motion, through a chain 45, from a sprocket 46 secured to the shaft 25. This chain may be provided with a tightener such as shown at 47 and which is provided with an idler 48 bearing on the chain. Lugs 49 extend inwardly from the sprocket 44 at diametrically opposed points and are directed toward a disk 50 which is fixedly mounted on the shaft 32. A clutch member 51 is pivotally mounted, as at 52, upon one face of the disk 50 and has a finger 53 extending outwardly from its free end, there being a laterally extending pin 54 upon the clutch member and which is adapted, under the action of a spring 55, to move inwardly toward the shaft 32 and into the path of one of the pins 49, thus to couple the disk 50 to the sprocket 44. The coupling member 51, however, during most of the time, is held with the pin 54 out of the path of the lugs 49, by a lever 56 fulcrumed as at 57 upon one side of the box 5 and connected, by means of a rod 58, to a crank arm 59 extending from one end of a shaft 60. This shaft is journaled on the top of the press box and has a finger 61 extending therefrom and into the path of a tappet 62 projecting laterally from one face of a controlling disk 63. This disk has radially extending pins or teeth 64 upon its periphery and the lower portion of the disk and the lowermost pins are adapted to extend through a slot 65 formed in the top of the press box 5. The pins 64 are thus supported in position where they will be engaged by the material being compressed within the machine.

A spring 66 may be mounted on the rod 58 for the purpose of holding lever 56 and the finger 61 normally in the positions shown in Figs. 2 and 13.

For the purpose of fastening together the ends of each tie, tying mechanism of novel form has been provided. As, in the present machine, two ties are provided for, it is to be understood that the means for fastening together the ends of each tie are similar and that they operate in unison. The shaft 32 has a sprocket 66 secured to it and this sprocket transmits motion through a chain 67, to a sprocket 68 to one side of which is secured a gear 69 and a larger mutilated gear 70. The gears 69 of the two tying mechanisms are arranged one above the other and an intermediate gear 71 meshes therewith and operates to transmit motion from one gear 69 to the other. Each of the mutilated gears 70 has teeth outstanding therefrom through one half the circumference thereof and formed in the back face of each mutilated gear is a cam groove 72 shown by dotted lines in Fig. 4. A portion of this cam groove is concentric with the smooth periphery of the mutilated gear 70, said concentric portion extending through about 180 degrees. Said groove is then curved outwardly, at one end of said concentric portion so as to form a knob-like protuberance 73 upon the inner wall of the groove. The remaining portion of the groove is concentric with the toothed periphery of the mutilated gear and is more remote from the center of the gear than is the concentric portion 72, this outermost concentric portion being indicated at 74. A lever 75 is pivotally mounted back of the mutilated gear and has a roller 76 which projects into the groove 72. A pawl 77 is pivotally connected to the free end of the lever and a spring 78 serves to hold the free end of the pawl normally pressed into engagement with a ratchet wheel 79. This ratchet wheel is keyed or otherwise secured to a sleeve 80 mounted for rotation within a bearing member 81 having an outstanding tubular boss 82 against the end of which the ratchet wheel 79 bears. A disk 83 is formed integral with the sleeve 80 at that end thereof nearest the press box 5 and has a series of preferably six peripheral notches 84, as shown particularly in Fig. 10, this notched disk constituting the movable gripping member of the tying mechanism. The bearing 81 has a rounded portion concentric with the sleeve 80. Within this rounded portion and in the same plane with the path of movement of the needle 39 is an L-shaped slot 85 the inner portion of which extends downwardly, as shown at 86. One of the notches 84 normally registers with the slot 85 so that a tie can be inserted freely into the two registering notches. The slotted portion of the bearing member 81 thus constitutes the fixed tie holding member, as will be hereinafter set forth.

A stem 87 is mounted for rotation within the sleeve 80 and is provided, at one end, with a gear 88 adapted to mesh with and to be actuated by the mutilated gear 70. The other end of the stem 87 has a twisting disk 89 formed integral therewith or secured thereto, said disk, as shown in Fig. 8, being provided with a bill 90 and with a radial slot 91 extending from the front or active edge of the bill inwardly to the center of the twisting disk. A ring 92 is mounted for rotation on the boss 82 and is held against lateral displacement by the ratchet wheel 79 and the bearing 81, this ring being provided with an outstanding or substantially radial arm 93 to the outer end of which is secured an arcuate spreading plate 94 which fits close against the rounded surface of the bearing member 81 and is normally supported above the path of the needle 39, as shown particularly in Fig. 4. A link 95 connects the arm 93 to the free end of lever 75. The inner face of the spreading plate 94 or, in other words, that face thereof nearest the rounded surface of the bearing member 81, is cut away longitudinally, as shown at 96, so as to permit the bill of the twister 89 to work freely back of the spreading plate 94. Secured to that side of the bearing member 81 nearest the movable holding disk 83, is a shearing blade 97, this blade being designed to coöperate with one wall of each of the notches 84, for the purpose of severing the tie at the proper time during the operation of the machine.

It is to be understood that during the operation of the machine the shafts 25 and 19, and the sprocket 14 constantly rotate. During the pressing operation the straw or other material ordinarily discharged into the stacker, is directed into the feed casing 3 and the rotating worm or screw 20 forces it downwardly through the inlet 7 and into the path of or onto the upper wing 28 of the follower 22. This follower, obviously, reciprocates continuously during the rotation of shaft 25 and the material deposited in the path thereof is pressed into the box 5 toward the outlet end thereof. The tie wires, prior to the feeding of material into the box, are each arranged with one end pinched between the adjoining faces of the members 81 and 83, said tie being extended through the corresponding needle receiving openings 30, through the eye of the needle, and thence through the guides 42 to the reel Y. It will be apparent, therefore, that as the material is pressed into the box 5 by the follower 22, said material will push against those portions of the tie wires extending transversely of the box and will gradually cause the wires to pull through the eyes of the needles and off of the reels. As the material is gradually packed and pushed toward the outlet of the box 5, it engages the pins 64 on disk 63 and causes said disk to rotate slowly, the material being held under pressure by the dogs 8 while the follower is moving back toward the shaft 25. The disk 63 is so proportioned that when the bale has reached desired proportions, said disk will complete a rotation, thereby causing the tappet 62 to strike finger 61 and press it downwardly. Rod 58 will therefore pull upwardly on lever 56 and cause the free end of the lever to shift out of the path of the clutch member 51. Spring 55 will promptly shift said clutch member toward the shaft 32 and bring the pin or projection 54 into the path of one of the lugs 49. Disk 50 will therefore be coupled to the sprocket 44 which continuously rotates and will move with said sprocket until the disk has completed one rotation. This one rotation will be sufficient to bring the projecting finger 53 of the clutch member 51 against the free end of lever 56 which has, in the meanwhile, been shifted back to normal position by the spring 66. When finger 53 engages lever 56, the clutch member 51 is shifted outwardly so as to bring the projection 54 out of the path of the studs 49, thereby uncoupling disk 50 from the sprocket 44 and bringing the disk 50 to a stop. This one rotation of disk 50, however, will be sufficient to operate the needle and the tying mechanism as follows:—

Shaft 32 rotates with the disk 50 and as this shaft has gear 33 secured to it, it will be seen that motion will be transmitted through crank arms 35 and 37 and pitman 36 to the needle shaft 38. Each needle will thus be swung through the openings in the path thereof so as thus to bring the tie wire across that face of the bale nearest the follower 22. This movement of the needle will not be interfered with by the follower for the reason that said follower has a groove 31 therein of sufficient size to receive the needle should it be necessary for the needle to move across the bale while the follower is close to or in contact with the bale. During this movement of the needle toward the tying mechanism, the sprocket 66', which also rotates with shaft 32, is driving the chain 67, sprocket 68 and gears 69 and 71. The mutilated gears 70 are also being turned but during the first half of the rotation of each of these mutilated gears, and at which time the needle is moving toward the tying mechanism, said gears have no effect for the reason that the smooth portions of their peripheries are adjacent the gears 88. At the same time the roller 76 of each lever is within that portion of the cam groove 72 concentric with the smooth periphery of the mutilated gear and the lever 75 will thus be shifted. The parts are so timed that, as soon as the needle reaches the limit of its movement toward the tying mechanism the knob 73 formed by one wall of the cam groove 72 engages the roller 76 and causes said lever 75 to shift laterally with a quick movement, thereby causing the pawl 77 to give a slight turn to the ratchet wheel 79. As the movable holding member 83 rotates with this ratchet wheel it will be seen that one strand of the wire X, which has been guided into the slot 85 and the notch 84 registering therewith, will be forced downwardly into the extension 86, by the rotating member 83, thus securely fastening the tie wire X to the gripping members 81 and 83. Thus as the needle moves back to its initial position the wire will be held in engagement with the holding members 81 and 83.

Simultaneously with the initial shifting of the movable gripping member, in the manner described, the toothed portion of the gear 70 moves into engagement with gear 88 and begins to rotate the twisting disk 89. Bill 90 thus moves downwardly toward the near strand of the tie wire and after it engages said strand the roller 76 passes into the portion 74 of the cam groove 72 and lever 75 therefore actuates link 95 and causes the spreading plate 94 to pass between the two strands of the tie wire and thus prevent the bill 90 from engaging both strands. Pawl 77 also engages and rotates the ratchet wheel 79 a sufficient distance to carry the engaged strand of the tie wire against the shearing blade 97 where the wire is severed, one end remaining loose within the notch 84 while the other end remains clamped between the two faces of the members 83 and 81. While this operation is taking place the gear 88 has been rapidly rotating so as to twist together the end of the tie wire previously held and that end subsequently fed into the slot 85. Upon the completion of one-half revolution of the mutilated gear 70, the spreading plate 94 moves back to its initial position and that end of the tie wire which was left clamped between the members 81 and 83 becomes seated within the notch 84. The bill 90 of the twisting disk 89 also assumes its initial position and, as the needle has already moved back to its initial position beyond one side of the press box, it will be apparent that the mechanism is thus reset for a repetition of the foregoing operation.

Importance is attached to the fact that the follower 22 is not adapted to reciprocate in timed relation with the binding and tying mechanism but is entirely independent thereof and is used solely for the purpose of compressing the material into bales. It is immaterial in so far as the binding and tying mechanism is concerned, what may be the position of the follower at the instant that the binding and tying operation is completed.

While the mechanism herein described is particularly designed as a part of a threshing machine, it is to be understood that the baling mechanism can be used separately and in such case the power may be taken from a suitable motor provided solely for that purpose.

The press box 5 and the parts carried thereby can be hingedly connected to the frame or to the extension 2 of the threshing machine so that, when the machine is turning, the baling mechanism will be free to swing laterally. Any suitable mechanism may be provided for this purpose and it is not deemed necessary to illustrate the same in the present application.

What is claimed is:—

1. In a baling press the combination with a press box and a follower mounted to reciprocate therein, of a needle normally mounted beyond one wall of said box and movable to convey a tie between the follower and the compressed material and across the box, normally registering fixed and movable holding members for the reception of said tie, means for actuating the movable member to engage one strand of the tie during the return movement of the needle, means for twisting the meeting portions of the tie, means for severing said twisted portion from the unused portion of the tie, and means under the control of the compressed material for actuating the needle, the movable holding member, the twisting means, and the severing means in properly timed relation.

2. The combination with a press box and a follower therein, of a fixed and a movable holding member, said members normally registering, a needle movable between the follower and the compressed material to convey a tie to the holding members, means for automatically shifting the movable holding member to engage one strand of the tie upon the completion of the movement of the needle toward the holding members, means for automatically spreading apart the strands of the tie during the return of the needle to normal position, and means for automatically engaging and twisting said strands together.

3. The combination with a press box and a follower therein, of a fixed and a movable holding member, said members normally registering, a needle movable between the follower and the compressed material to convey a tie to the holding members, means for automatically shifting the movable holding member to engage one strand of the tie upon the completion of the movement of the needle toward the holding members, means for automatically spreading apart the strands of the tie during the return of the needle to normal position, means for automatically engaging and twisting said strands together, and means under the control of the material being pressed for actuating the movable holding member, the spreading means and the twisting means and the needle in properly timed relation.

4. The combination with a press box and a follower therein, of a fixed and a movable holding member, said members normally registering, a needle movable between the follower and the compressed material to convey a tie to the holding members, means for automatically shifting the movable holding member to engage one strand of the tie upon the completion of the movement of the needle toward the holding members, means for automatically spreading apart the strands of the tie during the return of the needle to normal position, means for automatically engaging and twisting said strands together, a cutting element, and means for actuating the movable holding member to sever the twisted portion of the tie from the unused portion and to bind the end of the unused portion of the tie between the fixed and the movable holding members.

5. The combination with a press box and a follower therein, of a fixed and a movable holding member, said members normally registering, a needle movable between the follower and the compressed material to convey a tie to the holding members, means for automatically shifting the movable holding member to engage one strand of the tie upon the completion of the movement of the needle toward the holding members, means for automatically spreading apart the strands of the tie during the return of the needle to normal position, means for automatically engaging and twisting said strands together, a cutting element, means for actuating the movable holding member to sever the twisted portion of the tie from the unused portion and to bind the end of the unused portion of the tie between the fixed and the movable holding members, and means under the control of the material being pressed, for operating the holding, twisting and severing mechanism in properly timed relation.

6. In a baling press the combination with a press box, a follower, and a needle mounted to travel between the follower and the compressed material to convey a tie between the follower and the material, of a fixed and a movable holding member having registering notches for the reception of one strand of the tie, a revoluble cam, means actuated thereby for shifting the movable holding member successively to first secure the tie within the fixed holding member and subsequently pinch it between the movable and fixed members, a slotted twisting disk having a bill extending therefrom for engaging the tie, a gear revoluble with the twisting disk, a mutilated gear movable with the cam for rotating the first named gear and the twisting disk during a portion of the rotation of the cam, and means operated by said cam for shifting one strand of the tie out of the path of the bill of the twister.

7. In a baling press, the combination with a press box, a follower, and a needle mounted to travel between the follower and the compressed material to convey a tie between the follower and the material, of a fixed and a movable holding member having registering notches for the reception of one strand of the tie, a revoluble cam, means actuated thereby for shifting the movable holding member successively to first secure the tie within the fixed holding member and subsequently pinch it between the movable and fixed members, a slotted twisting disk having a bill extending therefrom for engaging the tie, a gear revoluble with the twisting disk, a mutilated gear movable with the cam for rotating the first named gear and the twisting disk during a portion of the rotation of the cam, means operated by said cam for shifting one strand of the tie out of the path of the bill of the twister, and means for automatically severing the twisted portion of the tie from the unused portion of the tie pinched between the holding members.

In testimony that I claim the foregoing as my own, I have hereto affixed my signature in the presence of two witnesses.

OTTO KLUGE.

Witnesses:
 THOS. H. CL.
 DAISY V. McCoy.